Dec. 27, 1960  D. R. PACKARD  2,965,957
WIRE CRIMPING AND STRIPPING APPARATUS
Filed Feb. 7, 1958  5 Sheets-Sheet 1

INVENTOR.
DAMON R. PACKARD
BY
Curtis, Morris & Safford

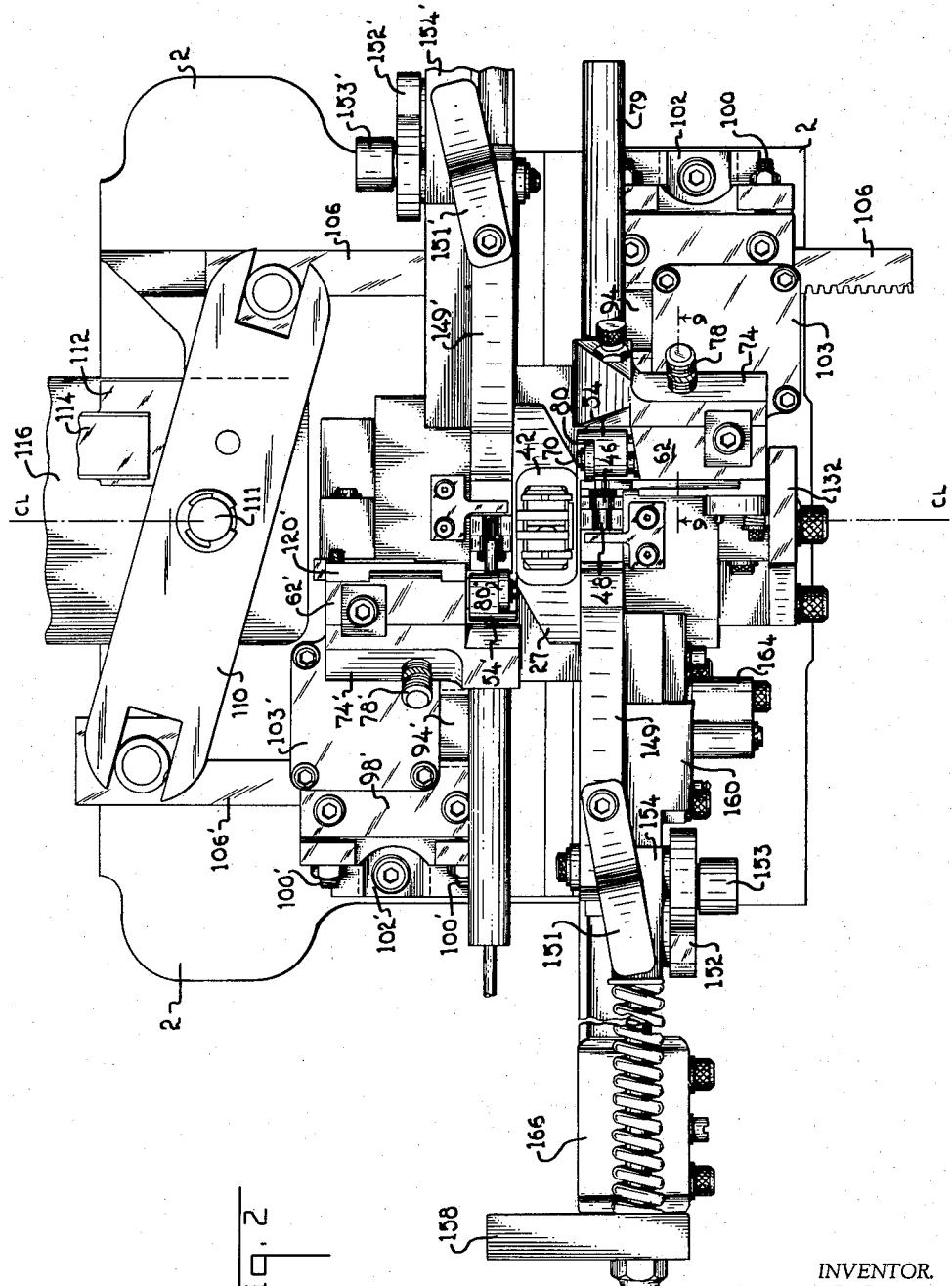

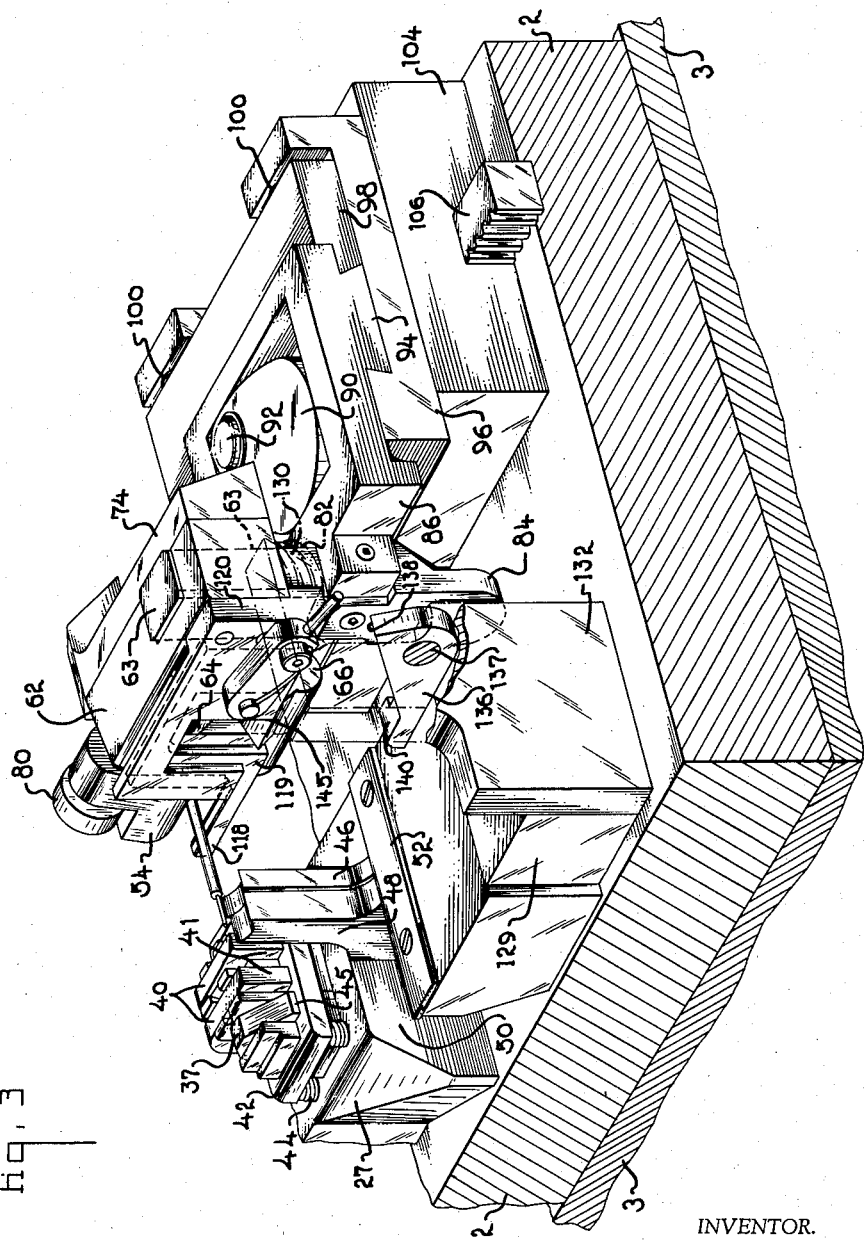

Dec. 27, 1960
D. R. PACKARD
2,965,957
WIRE CRIMPING AND STRIPPING APPARATUS
Filed Feb. 7, 1958
5 Sheets-Sheet 4
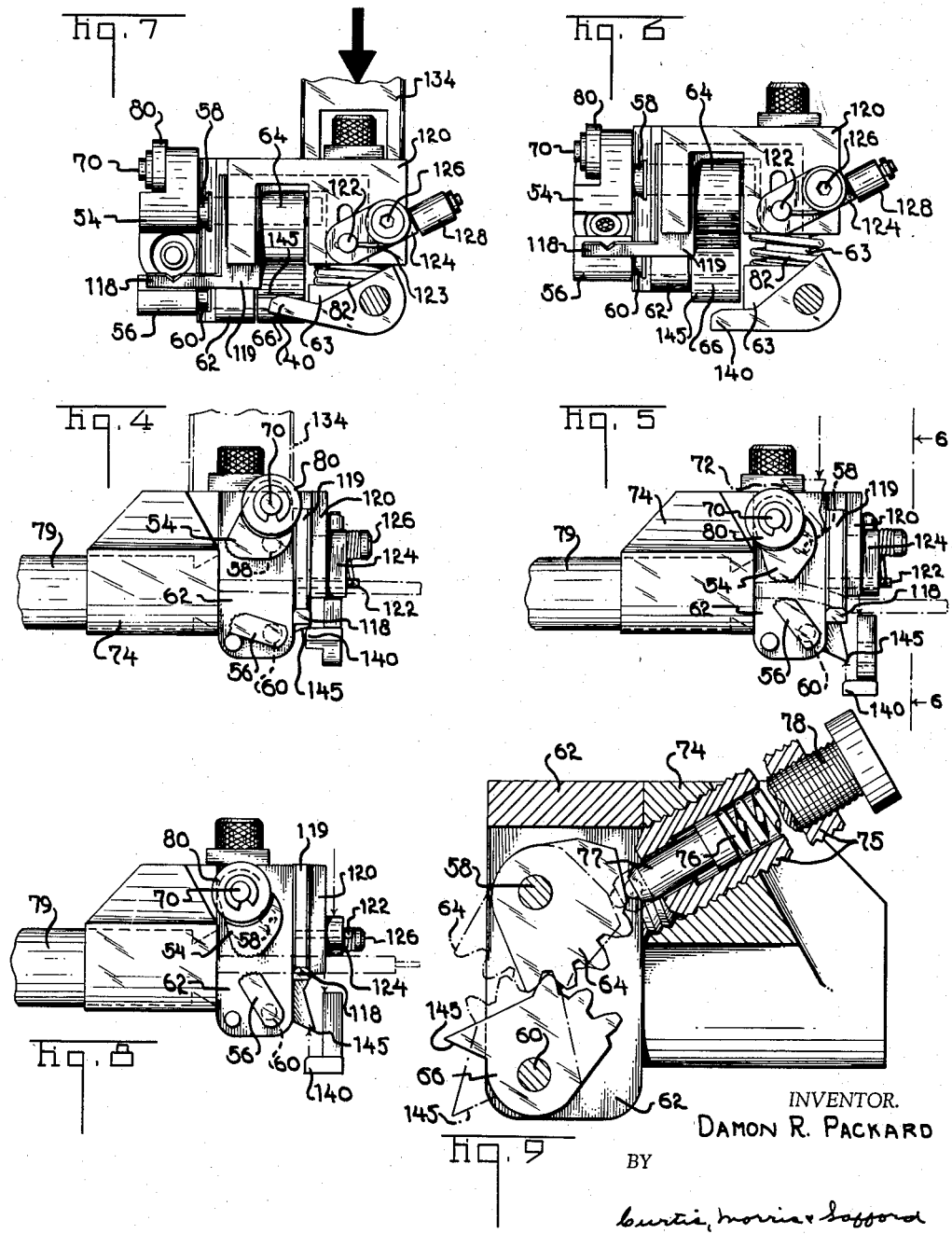
INVENTOR.
DAMON R. PACKARD
BY
Curtis, Morris & Safford Dec. 27, 1960  D. R. PACKARD  2,965,957
WIRE CRIMPING AND STRIPPING APPARATUS
Filed Feb. 7, 1958  5 Sheets-Sheet 5
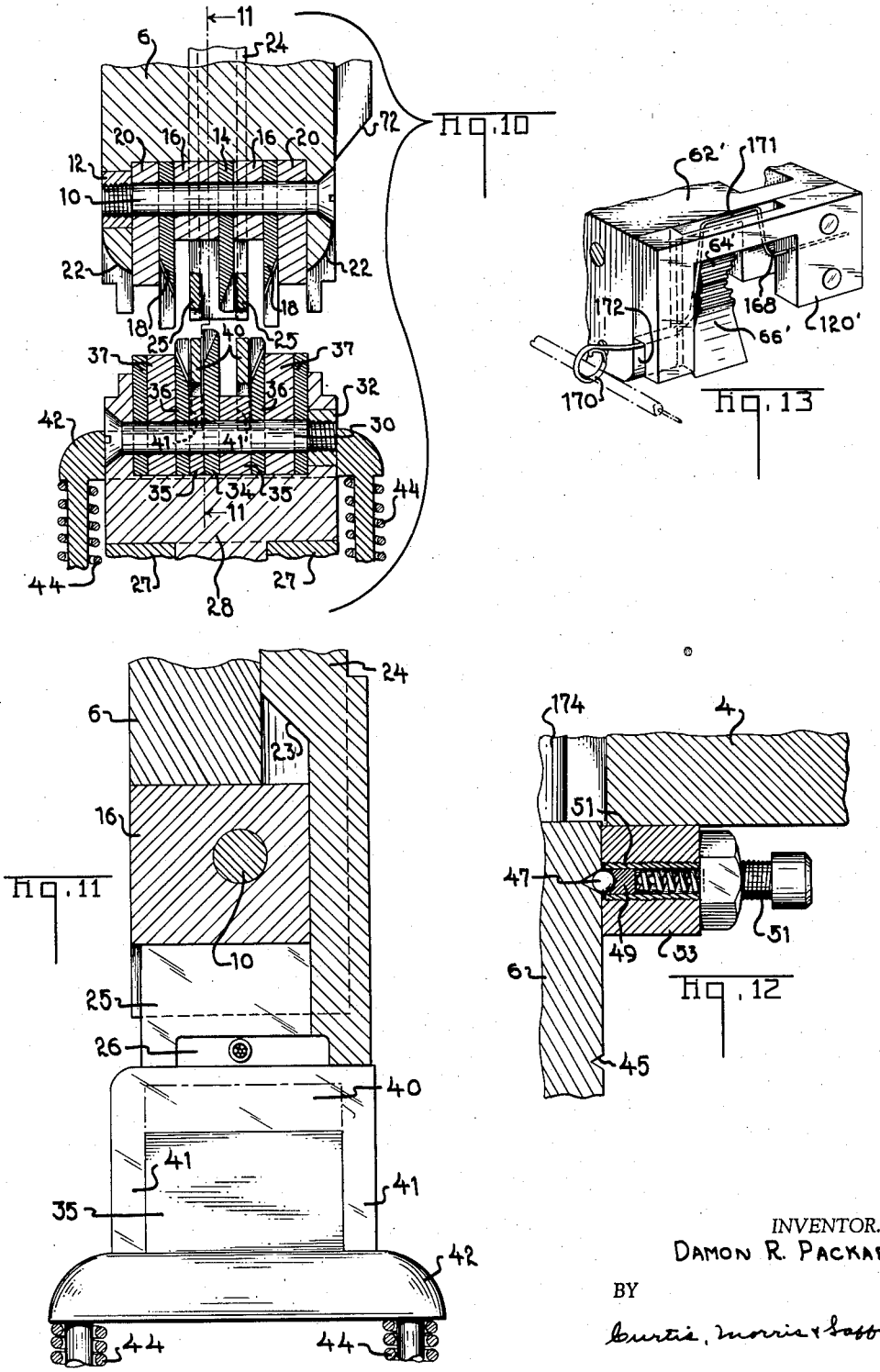
INVENTOR.
DAMON R. PACKARD
BY

United States Patent Office 2,965,957
Patented Dec. 27, 1960

2,965,957

WIRE CRIMPING AND STRIPPING APPARATUS

Damon R. Packard, Elizabethtown, Pa., assignor to AMP Incorporated, Harrisburg, Pa.

Filed Feb. 7, 1958, Ser. No. 713,862

2 Claims. (Cl. 29—203)

This invention relates to fully automatic lead-making machine and constitutes an improvement on the apparatus shown in the co-pending application of Harrold A. Kerstetter et al., Serial No. 562,198, filed January 30, 1956 for Lead-Making Apparatus and Method.

In the Kerstetter et al. application there is shown a fully automatic lead-making machine in which wire is fed through and for a definite distance beyond a cutting and stripping zone, a lead is severed from the fed wire, and substantially simultaneously the insulation adjacent the leading end of the wire and the trailing end of the lead is circumferentially cut. Thereafter the lead and wire are moved axially relatively away from each other while the severed sections of insulation are retained against movement to strip these severed sections from the conducting cores of the lead and wire. The leading end of the wire and the trailing end of the lead are then transferred laterally in opposite directions and positioned within uncrimped terminals at terminal crimping stations. The terminals are then crimped, the finished lead is ejected and the wire is again fed past the cutting and crimping zone to initiate a new cycle.

The apparatus shown in application Serial No. 562,198 requires a means for gripping the leading end of the wire and the trailing end of the lead during the stripping and transfer operations and it is desirable that the leading and trailing ends be released from the gripping means prior to crimping so that the leading end and the trailing ends will be free to move during the crimping operation in order to avoid the imposition of unduly high stresses on the wire as the terminal is crimped. One of the objects of the present invention is the provision of an improved gripping means for the wire and lead which is positive in operation during the transfer process and which releases the wire or lead at precisely the proper instant at the end of the transfer process.

A difficulty sometimes encountered in the operation on the apparatus shown in Serial No. 562,198 is the positioning of the stripped ends of the wire and lead within the uncrimped terminal. This operation is particularly difficult where an open U-type terminal having relatively high sidewalls is employed since for a proper crimped connection, all of the strands of the conducting core of the wire and lead must be positioned within the terminal prior to crimping. A further object of the present invention is the provision of a positioning means which accurately positions the bared ends of the wire and lead within the uncrimped terminal.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

In the drawings:

Figure 2 is a plan view taken along the lines II—II of Figure 1;

Figure 3 is a perspective view showing the lower wire insulation and lead insulation cutting blades, the lower crimping blades, and the lead transfer mechanism which appears on the right hand side of Figures 1 and 2;

Figure 4 is a side view of the lead gripping means in the open position;

Figure 5 is a view similar to Figure 4 but showing the lead gripping means in the closed position;

Figure 6 is a frontal view of the lead gripping means shown in the closed position taken along the lines 6—6 of Figure 5;

Figure 7 is a view similar to Figure 6 but showing the lead gripping means in the open position and immediately after the lead gripping jaws have been opened upon arrival at the crimping station;

Figure 8 is a view similar to Figure 5 but showing the lead positioning means in the elevated position;

Figure 9 is a sectional view taken along the lines 9—9 of Figure 2 showing an overcenter spring means for maintaining the gripping jaws in the open and closed position;

Figure 10 is a fragmentary view of the wire cutting blades and the insulation cutting and stripping blades;

Figure 11 is a view taken along the lines 11—11 of Figure 10 showing the insulation ejectors.

Figure 12 is a fragmentary sectional view of the upper die shoe and the cutting tool holder showing the releasable locking means for locking the tool holder and the die shoe together; and Figure 13 is a fragmentary perspective view showing a wire guide for guiding wire which is fed to the cutting and stripping blades.

Figure 1:
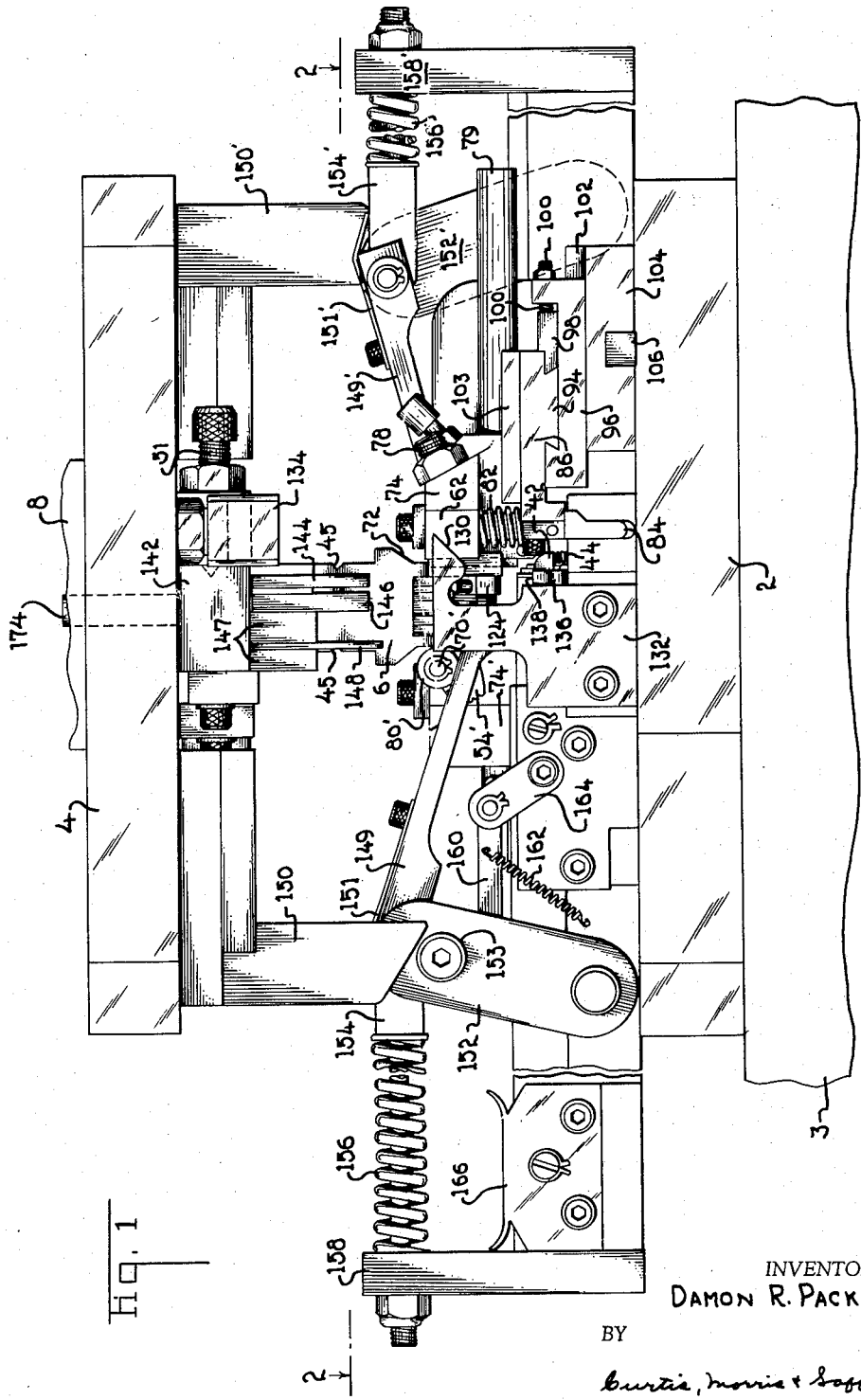
Figure 1 is a frontal view of the operating zone of a crimping apparatus in accordance with the present invention.

The stripping and crimping apparatus of the present invention is particularly adapted to be used in conjunction with a conventional press having a rotating shaft, a reciprocating ram, and an eccentric coupling between the ram and the shaft. Inasmuch as the press is conventional, it is not specifically shown in the drawing and only the stripping, crimping, and transfer mechanisms are illustrated. Reference is made to application Serial No. 562,198 for a showing of the manner in which the structure of the present invention can be mounted on a press.

Referring to Figure 2, it can be seen that corresponding elements are provided on each side of the center line marked CL for performing the various cutting, stripping, transferring and crimping operations on the trailing end of the lead and on the leading end of the wire. In the description which follows, particular attention will be directed to the elements which are related to the trailing end of the lead and specific reference will be made to the corresponding elements relating to the leading end of the wire which are identified by corresponding primed reference numerals where necessary and where there is a difference between the two sets of elements.

Referring now to Figures 1, 2 and 3, the reference numeral 2 denotes a lower die shoe which rests upon and is secured to the press platen 3. An upper die shoe 4 is secured to the end of a reciprocating ram 8 for movement towards and away from die shoe 2 and carries a tool holder 6 (Figure 10) in which are mounted the upper wire and insulating cutting knives. As shown best in Figure 10, a threaded fastener 10 extends through the lower portion of tool holder 6 and threadedly receives a clamping nut 12 on its end. Mounted on this threaded fastener is an upper wire cutting blade 14 having spacers 16 on each side thereof, and upper insulation cutting blades 18 disposed in spaced relation to and on each side of blade 14. Additional spacers 20 are interposed between the sides of blades 18 and the sides of the recess in the tool holder which receive this tooling. Curved surfaces on the side of tool holder 6 as shown at 22 facilitate the guiding and feeding of the wires through the conductor and insulation cutting zone. An L-shaped insulation ejecting device provides arms 25 which extend laterally beside the sides of conductor cutting blades 14 and has a leg portion 24 having a dove tail connection with tool holder 6 which permits free sliding motion of this ejector relative to the tool holder. The extent of this free sliding motion is limited by spacer 16 which enters a cut away section on the lower end of leg portion 24. A shoulder 23 of this cut away section bears against spacer 16 when the ejector is in its lower position and retains it in the tool holder. As shown best in Figure 11, arms 25 are cut away as shown at 26 to permit passage of the wire between the lower edges of arms 25 and a lower ejector 40 described below.

A block 27 (Figure 3) mounted on lower die shoe 2 provides an opening in which is mounted a lower tool holder 28 through which extends a fastener 30 and upon which are clamped by means of nut 32, a lower conductor cutting blade 34, spacers 35, lower insulation cutting blades 36, and additional spacers 37. The tooling on this lower tool holder is, as shown in Figure 10, in alignment with the tooling on tool holder 6 so that as the tool holder 6 moves towards and bottoms on tool holder 28, a fed wire is cut and insulation is severed on both the trailing end of the lead and the leading end of the wire adjacent the point of severance.

A lower insulation ejector provides cross members 40 which extend on each side of lower conductor cutting blade 34 and is secured by means of legs 41 to a generally rectangular frame 42. This frame surrounds tool holder 28 and is resiliently biased by means of springs 44 against shoulders 45 on spacers 38 (Figure 3). It will be apparent that this ejector and the frame 42 can be pressed against the force of springs 44 as described below.

Upper tool holder 6 is slidably mounted in an upper crimping tool holder 142 which in turn is secured to upper die shoe 4. Locking means are provided for locking this tool holder relative to the die shoe in either one of two positions as described in application Serial No. 562,198. In Figures 1 and 12, tool holder 6 is shown in its lowermost or extended position relative to die shoe 4 and is locked in this position by means of the ball bearing 47 which enters a suitable notch 45 in the tool holder. This ball bearing is biased by means of a spring biased plunger 49 mounted within a screw 51 which is threadedly received within a block 53 secured as by welding to die shoe 4. As the ram and die shoe descend, tool holder 6 and the tooling carried thereon bottom, prior to bottoming of the ram on the corresponding tooling of the lower tool holder to sever the lead and cut the insulation on the trailing end of the lead and the leading end of the wire. The ejectors surround the wire at this stage of the operation as shown in Figure 11 but do not clamp or contact the wire. Thereafter the ram continues to move downwardly relative to the tool holder and ball bearing 47 is urged against the force of the spring to disengage tool holder 6 from the upper die shoe. During the interval between bottoming of tool holder 6 and bottoming of the ram the leading end of the wire and the trailing end of the lead are shifted axially away from each other, to strip the cut sections of insulation, and are then shifted laterally to a crimping station having lower crimping anvils 46, 48 (Figure 3) mounted by means of a locking plate 52 in opening 50 of plate 27. The means for clamping the severed conductor and for transferring the severed lead from the cutting to the crimping station will now be described.

Referring particularly to Figures 3–8, an upper wire gripping jaw 54 is mounted on a rotatable shaft 58 which extends through a jaw carriage 62 and has secured on its opposite end a gear segment 64 in a cavity in this jaw carriage. This gear segment meshes with another gear segment 66 mounted on a shaft 60 which also extends through carriage 62 and mounts on its opposite end a lower wire gripping jaw 56. It will thus be apparent that when jaw 54 is rotated on its axis 58 from the position of Figure 4 to the position of Figure 8 in a counterclockwise direction, jaw 56 will be rotated in a clockwise direction by virtue of the linkage of gear segments 64, 66. The jaws are kept in either the open or closed position by means of a spring biased plunger provided in a block 74 secured to the side of block 62. As shown in Figure 9, a drilled opening in block 74 accommodates a threaded sleeve 75 which receives a screw 78 which is internally bored to accommodate a spring 76 which urges the plunger 77 having a ball bearing on the end thereof against a contoured surface on gear segment 64. The gear segment is free to rotate from one position to the other but in doing so it must compress this spring so that the jaws cannot be accidentally opened or closed.

At the beginning of the operating cycle, the jaws are opened as shown in Figure 4 and jaw carriage 62 is positioned such that these jaws are in alignment with the insulation cutting and wire cutting tooling. Wire is fed by means of an automatic wire feeding means over the insulation and wire cutting tooling and between the jaws into an ejector tube as shown at 79. Thereafter ram 8 descends and as tool holder 6 approaches its bottom position, a cam surface 72 on this tool holder contacts a roller 80 mounted on a stub shaft 70 extending from jaw 54. This cam surface causes roller 80 to move leftwardly in Figure 4 thus rotating jaw 54 in a counterclockwise position about its axis and closing the jaws onto the lead as shown in Figure 8. Jaw carriage 62 is then moved along a substantially U-shaped path to position the stripped end of the lead at the crimping anvil as shown in Figure 3. The mechanism for moving the jaw carriage along this U-shaped path will now be described.

Jaw carriage 62 is slidably mounted on a non-circular post 63 which extends downwardly through an opening in a slide member 86 and provides a reduced end portion 84 which rests upon die shoe 2. A coil spring 82 interposed between slide 86 and carriage 62 normally biases carriage 62 to the position of Figure 3. Slide member 86 is centrally open and receives in its central open portion a cam 90 mounted on a shaft 92 which extends downwardly through a second sliding block 96 into a fixed block 104. Advantageously a cover 103, Figure 2, is provided on block 86 to protect cam 90. Sliding block 96 has a dove tail connection 94 with block 86, one side of the dove tail being formed by a gib 98 adjustable by means of screws 100. Block 96 in turn has a dove tail connection 102 with block 104, the dove tail at 102 extending at right angles to the dove tail 94.

On the end of shaft 92 and within fixed block 104 is mounted a gear segment (not shown) which meshes with a rack bar 106. Upon reciprocation of rack bar 106 and through a distance sufficient to rotate cam shaft 92 through an angle of about 270°, jaw carriage 62 is displaced along a U-shaped path from the crimping station to the cutting station or from the cutting station to the crimping station, depending upon the direction of rotation of shaft 92. For example, referring to Figure 3 if shaft 92 is rotated in a counterclockwise direction from the position shown, slide members 96 and 86 will first move rightwardly as a unit on block 104 by virtue of dove tail 102. Thereafter slide member 86 will move toward the rear of die shoe 2, as viewed in Figure 2 and relative to block 98, and during about the final 90° of the rotation of the cam 90, slide member 86 and slide member 96 will move as a unit leftwardly relative to block 104. Reciprocation of rack bar 106 is achieved by means of a lever 110 pivoted intermediate its ends at 111 and secured by means of a plate 112 to a slide member 114 which reciprocates on a plate 116 mounted on the lower die shoe. Slide member 114 is reciprocated by means of a cam operated from the main power shaft of the press as described fully in application Serial No. 562,198.

As the severed trailing end of the lead is delivered to the crimping station and to the lower crimping anvils 46, 48, in accordance with the present invention, the end of this lead is lifted slightly by a mechanism which will now be described. An arm 118 (Figure 3) which projects beneath the trailing end of the lead extends from a plate 119 which bears against the side of carriage 62 and is retained in place by means of a fixed plate 120 bolted or otherwise secured to carriage 62. A pin 122 extends from plate 119 through a slot in plate 120 and has secured on its ends a lever 124 which is pivoted at 126 to plate 120. Plate 119 is normally biased downwardly by means of a torsion spring 123 (Figure 7) which extends from pivot point 126 to pin 122 (Figures 4, 5 and 8). A cam follower 128 (Figure 7) is mounted on the end of lever 124 and this cam follower engages a camming surface 130 on a plate 132 which is secured to a block 129 resting on the upper surface of shoe 2. As the jaw carriage 62 delivers the stripped end of the lead to the crimping station, cam follower 128 engages camming surface 130 (Figure 2) and lever 124 is rotated clockwise about pivot 126 thus raising arm 118. This motion of the wire during the final stages of the transfer from the cutting to the crimping station is advantageous in that the stripped end of the wire is raised slightly to clear the upstanding sidewalls of the terminal which has previously been positioned on the anvils.

After the jaw carriage comes to rest in the position of Figure 3, and before the ram reaches its bottom dead center position, it is desirable to release the wire from the gripping jaws 54, 56 so that the end of the lead will be free and will not be stressed as the terminal is crimped. In my improved embodiment release of these jaws is effected by means of a depressor 134 carried by upper die shoe 4 which engages carriage 62 and pushes it downwardly against the compression of spring 82. In so doing, fixed plate 120 is brought into contact with an edge 138 of a lever 136 pivoted intermediate its ends at 127 to block 129. As jaw carriage 62 and plate 120 are further depressed, arm 140 of lever 136 is raised and brought into contact with a shoulder 145 on lower gear segment 66 thus causing this gear segment to be rotated in the direction to open the jaws, from the position of Figure 8 to the position of Figure 4. After the jaws have been opened in this manner, the ram reaches its bottom dead center position and the upper crimping dies, comprising an insulation support crimper 144 and a wire barrel crimper 146, curl the sides of the terminals around the wire. The upper tool holder 142 also carries spacers 147 a slugout blade 148 which removes connecting slugs between adjacent terminals so that upon completion of the crimping operation the lead can be ejected through tube 79 and the entire cycle started again.

Terminals are fed in accordance with the instant invention by means of a feed arm 149 which is urged against the strip of terminals by a spring 151 and is pivoted to a link 152 which carries a cam roller 153 and is also pivoted to a rod 154 having a compression spring 156 extending therearound to a plate 158. As die shoe 4 descends, cam 150 biases link 152 leftwardly thus retracting feed arm 149. Thereafter as the ram ascends, cam 150 is removed from engagement with follower 153 and arm 149 is pushed rightwardly in Figure 1 as spring 156 returns to its normal position. The rightward movement of arm 149 moves the next adjacent terminal of a strip of terminals into a position on the crimping dies. Preferably, a hold-down device 160, biased by means of a spring 162 and a link 164 is provided to retain the strip of terminals against their feed track which extends up to anvils 46, 48. An additional guide 166 is provided at the point where the strip of terminals enters the operating zone.

It will be noted from Figure 2 that the shifting mechanism for the leading end of the wire carried by jaw carriage 62' does not include a lifter corresponding to the lifter 118. As shown in Figure 13, a simplified wire guide 168 of flexible wire is provided. This guide is secured at one end to plate 120' and is bent in the form of a U in its central section as shown at 171. Adjacent its opposite end, the guide extends through a notch 172 in plate 120' and terminates in a loop 170 through which the leading end of the insulated wire extends. This wire guide normally maintains the leading end of the wire in an elevated position and the stripped leading end is lowered into the ferrule of the connector by the crimping dies at the time of crimping. It will be apparent that a wire guide of this type could not be used conveniently with the trailing end of the lead since it would be necessary to feed the insulated wire through the loop 170 and this would be difficult because of the flexibility of the wire and the speed with which it is fed.

After the terminals have been crimped onto the leading end and trailing end, the ram returns to its top dead center position and the shifting mechanisms are brought back into alignment by reciprocation of rack bars 106, 106'. During the upward movement, the ejectors 25, 40 disengage any sections of insulation which remain between the wire cutting blades and the insulation cutting blades. These remaining sections, after ejection, may be removed by means of a compressed air stream as disclosed more fully in application Serial No. 562,198.

Tool holder 6 is, at the end of the crimping operation, in its retracted position relative to upper die shoe 4. During upward movement of the ram, it is shifted to its extended position by means of a stationary rod 174 which engages the tool holder and restrains it from moving upwardly with the ram. When the ram reaches top dead center, the ball bearings 47 enter the upper set of notches 45 and the tool holder is locked in its extended position.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. In a lead making machine having a conductor transfer mechanism for transferring a conductor laterally of its axis to deliver the end of the conductor into an uncrimped terminal having a substantially U-shaped cross section, the improvement comprising, a plate carried by said transfer mechanism, a conductor lifter arm extending from said plate, a lever for moving said plate relative to said transfer mechanism thereby to move said lifter arm, and cam means engageable with said lever when said transfer mechanism reaches said uncrimped terminal thereby to actuate said lever and said lifter arm to position the end of said conductor in an uncrimped terminal.

2. In a lead making apparatus having a transfer carriage for transferring a conductor laterally of its axis from a cutting station to a crimping station, the improvement comprising, a plate movably mounted on said transfer carriage, said plate having a conductor lifter arm extending therefrom, lever means carried by said jaw carriage for moving said plate relative to said carriage thereby to move said lifter arm, and cam means adjacent said crimping station engageable with said lever thereby to actuate said lifter arm upon arrival of said transfer carriage at said crimping station and position the end of said conductor in an uncrimped terminal.

References Cited in the file of this patent

UNITED STATES PATENTS

| | | |
|---|---|---|
| 2,192,801 | Poole | Mar. 5, 1940 |
| 2,696,848 | McCoy | Dec. 14, 1954 |